Aug. 8, 1950     V. R. TRABUCCO     2,517,736
STROLLER
Filed May 22, 1947     4 Sheets-Sheet 1
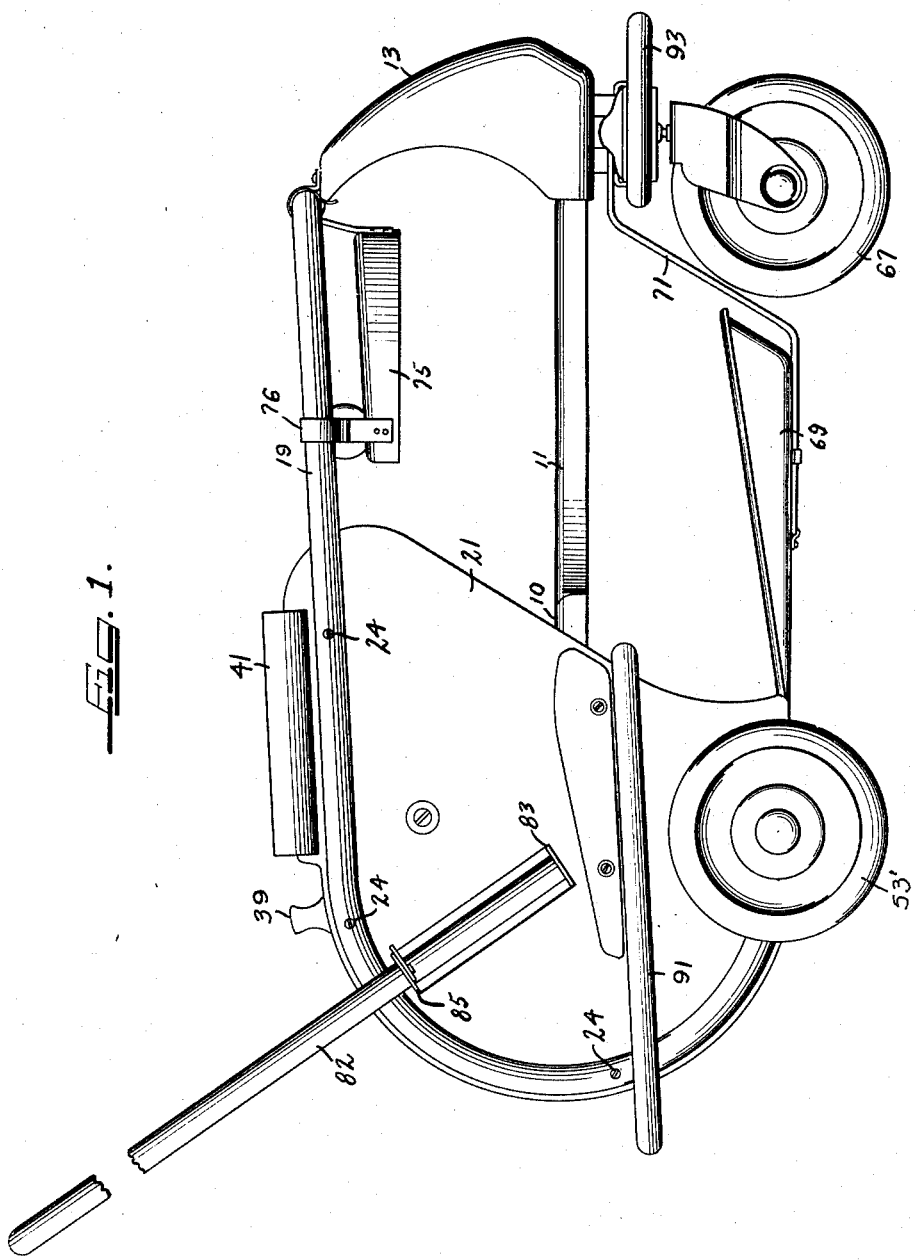
Inventor
VINCENT R. TRABUCCO.
by The Firm of Charles w Hills Attys.

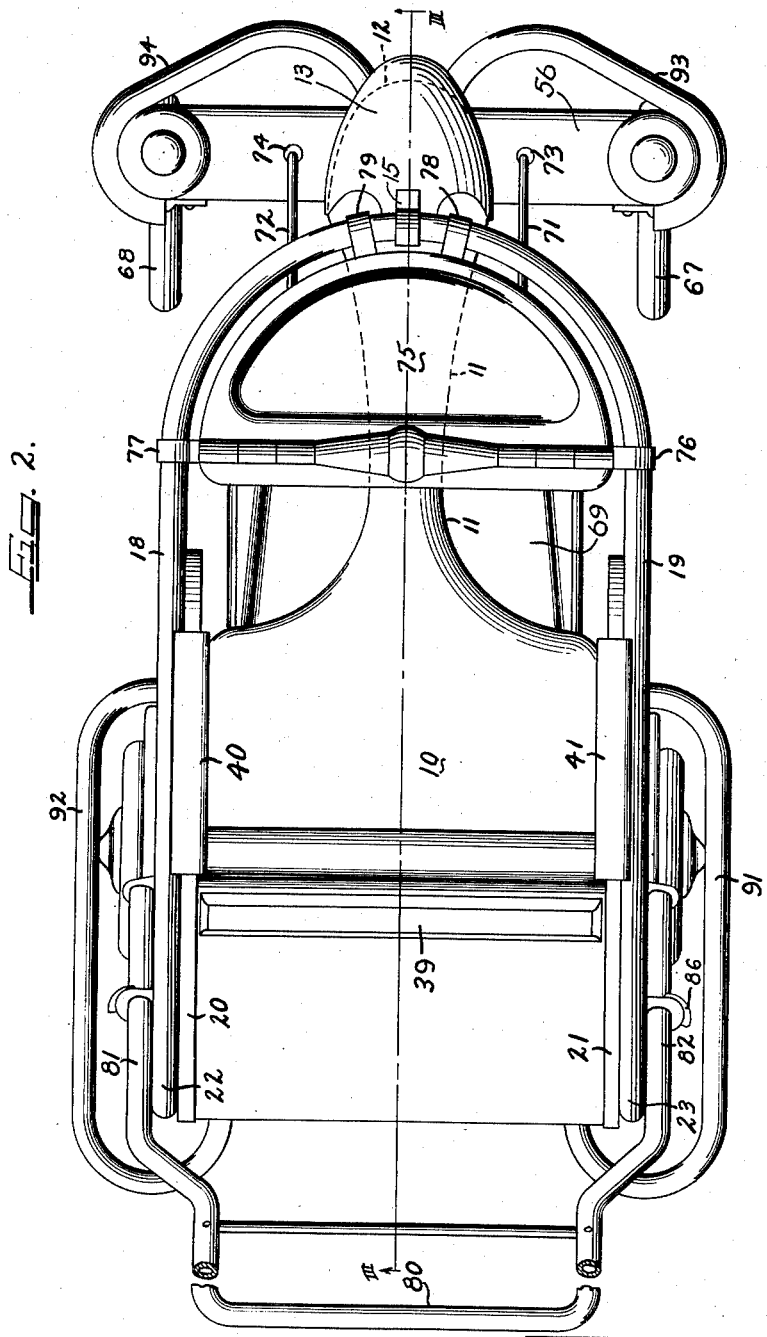

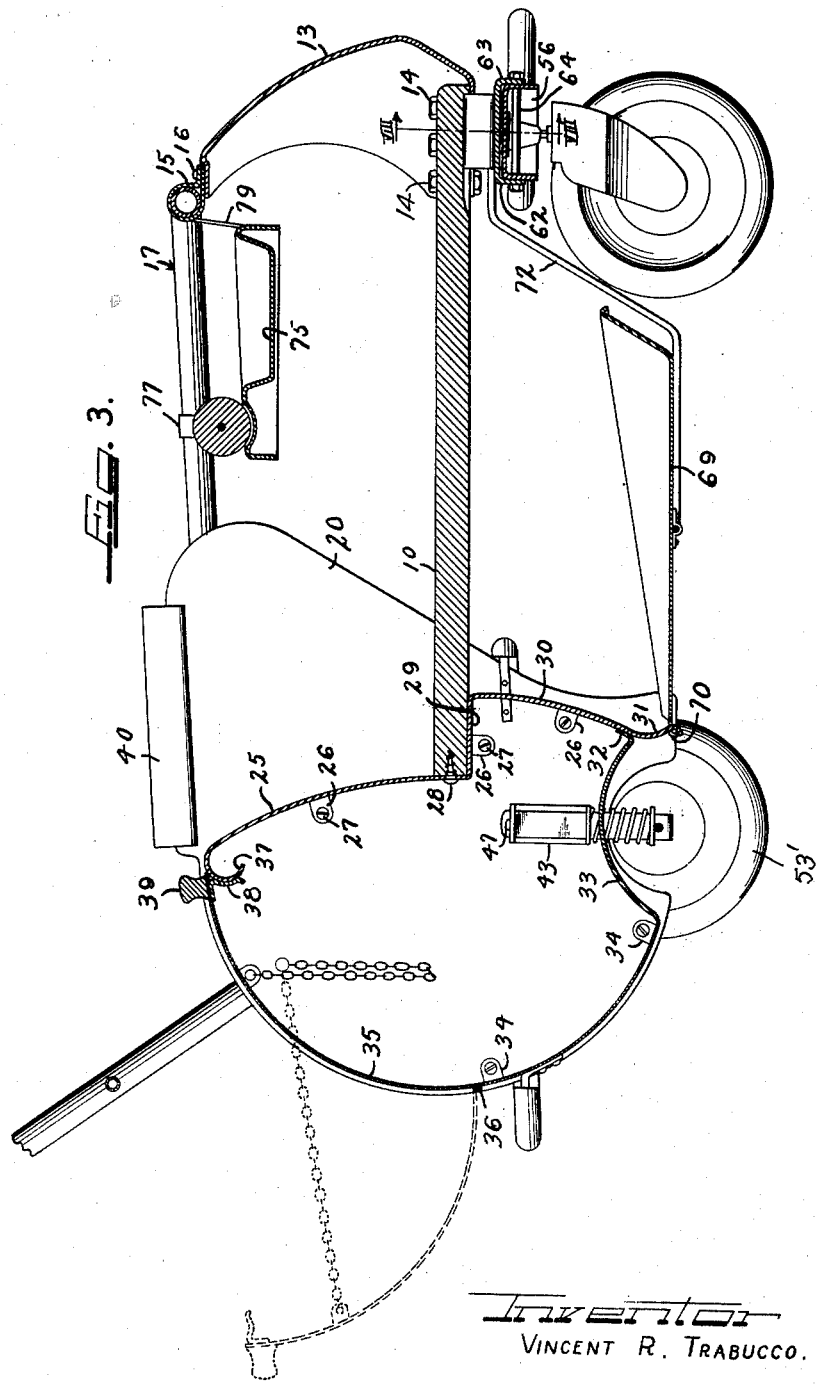

Aug. 8, 1950  V. R. TRABUCCO  2,517,736
STROLLER
Filed May 22, 1947  4 Sheets-Sheet 4
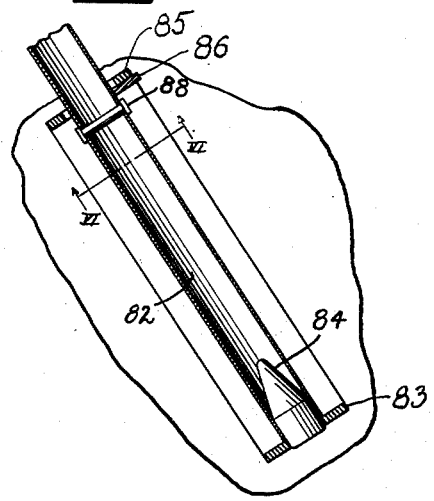
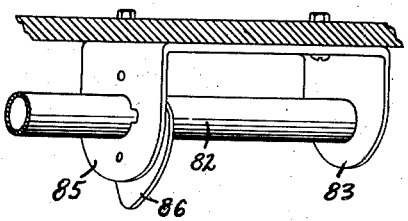
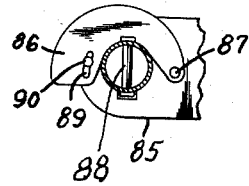
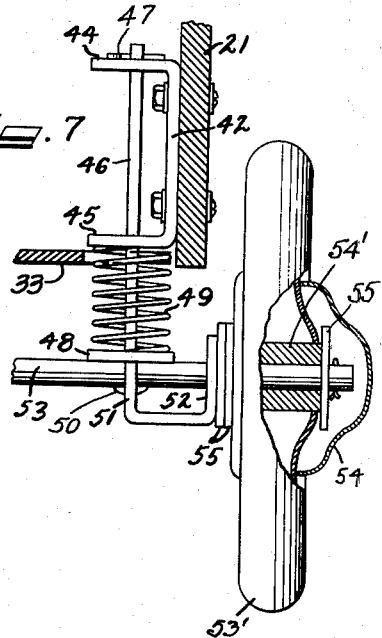
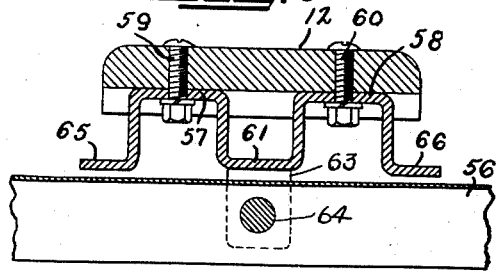
Inventor
VINCENT R. TRABUCCO.
by The Firm of Charles Hills
Attys.

Patented Aug. 8, 1950

2,517,736

UNITED STATES PATENT OFFICE 2,517,736

STROLLER

Vincent R. Trabucco, Steger, Ill., assignor to Steger Products Mfg. Corp., Steger, Ill., a corporation of Illinois Application May 22, 1947, Serial No. 749,842

2 Claims. (Cl. 280—47)

This invention relates to a combined stroller and walker, that is, a vehicle to which handles may be conveniently attached and used as a stroller in which a small child may be carried, or from which the handles may be removed and the child himself propels the vehicle as a walker or aid to walking.

The general object of the invention, therefore, is to provide a convertible vehicle which may be propelled as a stroller or carriage, and is also adaptable for use indoors for propulsion by the child itself.

Another object of the invention is to provide a device having the two foregoing advantages and also detachable equipment to facilitate the use of the device by the child as a chair.

Another object of the invention is to provide a wheeled vehicle having running gear attached thereto in such a manner as to make the device especially suitable for indoor use, yet not detracting from its adaptability for sidewalk use.

Other objects and advantages of the invention will become apparent upon a perusal of the following specification in which a preferred embodiment of the invention is shown and described.

On the drawings:

Figure 1 is a side elevation of the device assembled and ready for use as a sidewalk vehicle;

Figure 2 is a top plan view of the same device;

Figure 3 is a central longitudinal vertical section view of the device on the line III—III of Figure 2;

Figure 4 is an enlarged detailed sectional view of a portion of the handle attaching mechanism;

Figure 5 is a side elevation of the device shown in Figure 4;

Figure 6 is a sectional view on the line VI—VI of Figure 4;

Figure 7 is a detail showing the manner of mounting one of the rear wheels; and

Figure 8 is a sectional view taken on a vertical plane passing through the line VIII—VIII of Figure 3.

The vehicle includes a seat member 10 which may be made of any suitable material but preferably is made of wood, and which has a narrow tongue 11 extending forwardly therefrom and terminating in an enlarged front end portion 12 as shown in Figure 2. A hollow front post generally indicated as 13, is preferably fabricated from sheet steel and has its side margins bent under the portion 12 and secured thereto by means of a plurality of bolts such as 14. At the upper end of the post 13, a strap looped at 15 is secured to the post by a screw or rivet 16, and forms a support and attaching means for a tubular frame member generally identified as 17. This tubular member is preferably fabricated of a single strip of tubing bent in a U-shape in its upper plane to provide it with the legs 18 and 19, each of these legs being bent downwardly at its rear end to lie alongside of a pair of side plates 20 and 21 which enclose the side margins of the seat member and extend rearwardly therefrom to enclose a storage space at the rear of the seat. The rearwardly and downwardly curved portions 22 and 23 may be secured to the side plates 20 and 21 by means of a plurality of screws or rivets such as 24. While the side plates may be made of any appropriate material, I prefer to use wood.

While other means might be employed for attaching the seat to the side plates, I prefer to use a sheet metal wall 25 which forms a back for the seat and to form therefrom a plurality of flanges such as 26 which may be bolted to the side plates by bolts or screws such as 27. A plurality of screws such as 28 may then be employed to secure the seat member to the back just above and upon the ledge 29, which is formed from an extension of the back. A further downward extension of this same sheet of metal, indicated as 30, terminates in an apron 31 whose function will be mentioned hereinafter.

Spot welded along a horizontal line at 32 to the apron 31 is another metal sheet 33 extending rearwardly therefrom, and which is likewise provided with flanges such as 34 which also are bolted to the side plates 20 and 21. A cover member 35 is hingedly connected to the member 33 at a hinge line 36 to serve as an enclosure for the storage space formed at the rear of the seat back by means of the side plates, the bottom sheet 33 and the cover member 35.

When the vehicle is being used as a stroller, the storage space will be found extremely useful for a variety of purposes. The capacity of this storage space is large enough to make it very practical, especially if the device be built in accordance the the proportions shown in the drawing to have an overall length of approximately 24 inches, for example. This size is not critical but is cited to indicate that the storage compartment is not only ornamental, but could be decidedly useful.

As a simple means for latching the cover 35 in closed position, I prefer to form a curved flange at the upper end of the seat as shown at 37 and to provide a cooperating metal flange 38 secured to the cover so that it may have a snap action fit with the curved flange 37, and provide a handle 39 by means of which the cover may be manipulated.

Arm rests 40 and 41, suitably shaped and curved for comfort, may be secured to the top edges of the side plates 20 and 21.

The construction thus far described provides a rigid and very sturdy main body portion for the vehicle, since the seat member, the tubular member generally indicated as 17, and the side plates, together with the hollow post 13, form a rigid structure.

Since the vehicle is intended for extensive use as a sidewalk stroller, a spring support for the body upon the rear wheels is especially desirable. To accomplish this, I provide a pair of brackets such as 42 and 43 of identical construction, hence only one of them will here be described, as illustrated in Figure 7. The vertical portion of the bracket is bolted to the inner side of the plate, such as the plate 21, and has upper and lower flanges 44 and 45. A flat steel bar 46 extends upwardly through a slot in the upper flange, and a cotter pin 47 extends through an aperture in the upper end of this bar just above the flange 44. Between the lower flange and a washer 48, a spring 49 is held under compression. A key 50 engaging a key-way in the axle and a suitable slot in leg 51 holds the axle against rotation. The lower end of the bar 46 is bent into a U-shape to constitute the legs 51 and 52, which are provided with apertures through which the rigid axle 53 may be inserted. At each end of the axle rod 53 the rear wheels 53' are mounted, bearing members within the wheels being provided to enable the wheels to rotate on the stationary axle independently of each other, and a cap 54 may be provided to enclose the outside of the wheel to give it a trim appearance. The bearing may be provided with anti-friction elements, or may be merely a sleeve 54'' as shown, and is held against longitudinal movement on the axle rod by means of a plurality of washers such as 55.

The construction thus described affords a sturdy connection of the rear wheel axle to the side plates, supporting the vehicle and its passenger on the rear axle through the resilient cushion formed by the springs 49.

The front wheels are attached to the vehicle as follows: A bolster 56, which may be a solid member, but which, as illustrated, is preferably a channel-shaped metal member, extends transversely of the front end of the vehicle to form the means for attachment of the front wheels. This bolster, however, is pivotally connected with the seat member as follows: A metal bracket having upper horizontal portions 57 and 58 is bolted to the forward end of the seat member 12 by means of the bolts 59 and 60 as shown, and has a downwardly bent central portion 61 from which depends a pair of flanges 62 and 63 which embrace the bolster 56 and carry a pintle 64 extending through the bolster, serving to hingedly or pivotally connect the rigid seat member with the transverse bolster.

As shown in Figure 8, this bracket secured to the seat member also has a pair of depending flanges 65 and 66 which in the normal position of the vehicle are equally spaced a short distance above the top surface of the bolster. Hence the bolster may rock a limited amount relatively to the seat member, as would be desirable due to inequalities in sidewalk surfaces, but cannot rotate any more than is permitted by the flanges 65 and 66.

Near the opposite ends of the bolster caster constructions carrying the front wheels 67 and 68 are attached to the bolster so that the device may be steered in an obvious manner.

When the device is used as a stroller, the feet of the child must be supported. Hence, I provide a detachable foot rest including the pan 69 having a pair of hooks, one of which is shown in Figure 3, and numbered 70, which may be inserted through suitable slots therefor provided in the apron 31.

A pair of rods 71 and 72 extending forwardly from the foot rest may also be inserted in the slots 73 and 74 provided in the bolster.

Not only may this device be used as a stroller or a walker, but it may also be used as a chair, and is equipped with a removable tray generally indicated at 75, which may be detachably positioned on the tubular frame by means of hooks 76, 77, 78 and 79.

When the device is used as a walker, the tray and foot rest may be removed and the child may stand up, straddling the central tongue in the seat member, holding onto the tubular frame member, and may, of course, steer the device readily.

When the vehicle is used as a stroller, the foot rest is mounted on the vehicle and the handle is then attached. The handle comprises a U-shaped member having a handle portion 80 and a pair of arms 81 and 82, each of which may be inserted through a bracket such as is shown particularly in Figures 4 and 5. These brackets are mounted in any appropriate manner on the outside surfaces of the side plates, the lower flange 83 carrying a conically shaped post 84 over which the lower end of the arm 82 may be telescoped while the arm also passes through the upper bracket 85 and is clamped therein by means of the swinging pivoted lock plate 86 which is pivoted on the bracket at 87 and embraces the handle arm just above a rivet 88 whose opposite ends protrude through the handle arm sufficiently so that when the locking plate 86 is swung into locking position as shown in Figure 6, the rivet head would prevent the handle from being withdrawn from the bracket. A slot 89 in the locking plate serves to guide its pivotal movement in conjunction with a headed rivet 90 which is secured to the upper flange 85.

It is apparent therefore, that the handle, while readily detachable from the vehicle, may be securely locked in place thereon without very much effort.

Conventional bumpers, consisting of rods which are rubber covered, may be secured to the vehicle as indicated, these bumpers being identified in the drawings as 91, 92, 93 and 94.

It is found that the construction herein shown and described produces a vehicle at a reasonable cost, which is attractive in appearance yet extremely rugged. The front and back portions to which the wheels are connected are rigidly connected at two levels, that is, by the seat member and by the tubular member which is connected to the front post and to the outside surfaces of the side plates 20 and 21. The wheels are mounted yieldably relatively to the rigid frame, hence the vehicle is adaptable for sidewalk use.

While I have shown and described herein in considerable detail a preferred embodiment of the invention, it should be understood that the invention is not limited to the precise details as disclosed, but is subject to variation and modification without departing from the principles of construction defined in the appended claims.

I claim as my invention:

1. A vehicle comprising a rigid seat member having a broadened seat portion at its rear end and a narrow tongue portion extending forwardly therefrom, a front bolster extending laterally of the vehicle, a pair of front wheels swivelly connected to said bolster, means connecting said bolster to the front of said seat member including a pivot pin extending longitudinally of the vehicle, bumper means for positively limiting the rocking of the bolster relatively to the seat member, a pair of side plates embracing the lateral margins of said broadened seat portion extending upwardly and downwardly and rearwardly therefrom, thin sheet material secured to said side plates and said seat portion and shaped to form a back for the seat and forward and rear compartment walls and cooperating with said plates to form a storage compartment rearwardly of the seat and downwardly thereof, a pair of rear wheels yieldably connected with said side plates, a post comprising a pre-formed metal shell-like structure having U-shaped horizontal cross-sections throughout its height and a horizontal base portion rigidly secured at a plurality of spaced intervals to the front end of said seat member and extending upwardly therefrom, and a rigid guard and frame member secured to the upper end of said post extending laterally and rearwardly therefrom embracing the seating space and bent downwardly and forwardly alongside of and secured to said side plates at intervals.

2. A combined stroller and walker comprising a rigid seat member having a broad seat portion at its rear end and a narrow tongue portion extending forwardly therefrom, a front bolster extending laterally of the vehicle, a pair of front wheels swivelly connected to said bolster, means including a longitudinally extending pivot pin connecting said bolster rockably to the front of said seat member, a pair of rigid side plates embracing the lateral margins of said broadened seat portion extending upwardly and downwardly and rearwardly therefrom, thin sheet material secured to said side plates and to the rear edge of said seat portion and shaped to form a back for the seat and forming with said plates the forward, side and rear walls of a storage compartment rearwardly of the seat and downwardly and underneath thereof, a common rear axle and a pair of rear wheels thereon individually yieldably connected with said side plates, rigid post having a horizontal cross-section of channel-shape and having a flattened base portion rigidly secured to the front end of said seat member at a plurality of points and extending upwardly and rearwardly therefrom, and a hollow tubular rigid guard and frame member secured to the upper end of said post extending laterally and rearwardly therefrom embracing the seating space and bent downwardly and secured to said side plates near their upper and lower margins, a door movably mounted at the rear of said compartment completing the enclosure of said compartment and affording access thereto, a handle, and means for detachably securing the handle to the side plates of the vehicle.

VINCENT R. TRABUCCO.

REFERENCES CITED

The following references are of record in the file of this patent:

UNITED STATES PATENTS

| Number | Name | Date |
|---|---|---|
| D. 147,135 | Moran | July 15, 1947 |
| 1,782,742 | Perlmutter | Nov. 25, 1930 |
| 1,876,111 | Van Guelpen | Sept. 6, 1932 |
| 1,987,385 | Back | Jan. 8, 1935 |
| 2,124,199 | Lamb | July 19, 1938 |
| 2,426,432 | Breckner et al. | Aug. 26, 1947 |
| 2,426,642 | Remesch et al. | Sept. 2, 1947 |